(12) United States Patent
Dilg et al.

(10) Patent No.: US 6,360,936 B1
(45) Date of Patent: Mar. 26, 2002

(54) METHOD OF MANUFACTURING A COMPOSITE SHEET STEEL, ESPECIALLY FOR THE PROTECTION OF VEHICLES AGAINST SHOTS

(75) Inventors: Christoph Dilg, Dillingen; Uwe Hofmann, Beckingen; Claus Just; Hans-Jürgen Rögele, both of Dillingen; Helmut Schönberger, Saarlouis-Beaumarais; Jürgen Vogt, Dillingen-Diefflen, all of (DE)

(73) Assignee: Aktiengesellschaft der Dillinger Hüttenwerke, Dillingen (DE)

( * ) Notice: Subject to any disclaimer, the term of this patent is extended or adjusted under 35 U.S.C. 154(b) by 0 days.

(21) Appl. No.: 09/670,111

(22) Filed: Sep. 26, 2000

(51) Int. Cl.⁷ .............................. B23K 20/08; B23K 1/19
(52) U.S. Cl. ............... 228/107; 228/262.41; 228/262.2; 428/638; 148/621
(58) Field of Search ........................... 228/107, 262.41; 428/638; 148/621

(56) References Cited

U.S. PATENT DOCUMENTS

| | | | | |
|---|---|---|---|---|
| 3,642,595 A | * | 2/1972 | Saul ............................ | 148/143 |
| 3,658,513 A | * | 4/1972 | Clarke, Jr. .................... | 75/124 |
| 3,885,922 A | * | 5/1975 | Thomas, Jr. et al. ........... | 29/191 |
| 3,929,467 A | * | 12/1975 | Davies et al. ................ | 75/93 G |
| 4,941,927 A | * | 7/1990 | Hickey, Jr. et al. ......... | 148/11.5 |
| 5,103,870 A | * | 4/1992 | Ishii et al. ................... | 138/140 |
| 5,180,450 A | * | 1/1993 | Rao ............................ | 148/579 |
| 5,246,511 A | * | 9/1993 | Nakamura et al. ............ | 148/621 |
| 5,254,383 A | * | 10/1993 | Harpell et al. ................. | 428/68 |
| 5,720,830 A | * | 2/1998 | Wragg et al. ................. | 148/326 |
| 5,866,066 A | * | 2/1999 | Hemphill et al. .............. | 420/83 |
| 6,168,756 B1 | * | 11/1999 | Hirasawa et al. .............. | 420/70 |
| 6,060,180 A | * | 5/2000 | Ishitsuka et al. ............. | 428/683 |

FOREIGN PATENT DOCUMENTS

| | | | |
|---|---|---|---|
| DE | 2911408 | 3/1990 | |
| DE | 4344879 | 7/1995 | |
| DE | 4344879 A1 | * 8/1997 | ................. 148/143 |

* cited by examiner

Primary Examiner—Tom Dunn
Assistant Examiner—L. Edmondson
(74) Attorney, Agent, or Firm—Friedrich Kueffner

(57) ABSTRACT

In a method of manufacturing composite sheet steel of maraging steel, wherein the composite sheet steel comprises an outer layer and an inner layer, wherein the outer layer is harder than the inner layer and the inner layer is more tenacious than the outer layer, the steel of the inner layer is produced with a chemical composition containing in percent by weight: $C \leq 0.01$, $Si \leq 0.1$, $Mn \leq 0.1$, $P \leq 0.005$, $S \leq 0.005$, $Cu \leq 0.1$, Mo 4.80 to 5.20, Ni 17.5 to 18.5, $Cr \leq 0.1$, Ti 0.55 to 0.70, Co 8.0 to 9.0; and the steel of the outer layer is produced with purification in a zone melting process with a chemical composition containing in percent by weight: $C \leq 0.01$, $Si < 0.1$, Mn 0.02 to 0.20, $P \leq 0.005$, $S \leq 0.005$, Cu 0.01 to 0.20, Mo 4.80 to 5.20, Ni 17.5 to 18.5, Cr 0.01 to 0.20, Ti 1.80 to 1.95, Co 14.0 to 15.5, Al 0.05 to 0.15, with the remainder being Fe and contaminants resulting from the manufacturing process, respectively. The composite sheet steel is used as a protection against shots and the effect of explosives.

12 Claims, No Drawings

METHOD OF MANUFACTURING A COMPOSITE SHEET STEEL, ESPECIALLY FOR THE PROTECTION OF VEHICLES AGAINST SHOTS

BACKGROUND OF THE INVENTION

1. Field of the Invention

The invention relates to a method of manufacturing composite sheet steel of maraging steel, especially for the protection of vehicles, in particular, passenger cars and transport vehicles for valuables, against shots and the effect of explosives, wherein the composite sheet steel comprises a harder outer layer and a more tenacious inner layer.

2. Description of the Related Art

Such a composite sheet steel is known from DE 43 44 879 C2.

The outer layer contains 4.0 to 6.0% Mo, 17.0 to 18.0% Ni, <0.05% Cr, 1.7 to 1.8% Ti, and 14.0 to 15.0% Co, while the inner layer contains 4.0 to 6.0% Mo, 17.0 to 18.0% Ni, <0.08% Cr, 0.5 to 0.8% Ti, and 7.0 to 9.0% Co. Both layers contain moreover <0.02% C, <0.06% Si, <0.01% Mn, <0.01% P, <0.01% S, and under <0.02% Cu, with the remainder being Fe and contaminants resulting from the manufacturing process.

A contact surface is to be made planar and to be cleaned by planing on two blocks of the two steels, respectively, whereupon the blocks are placed onto one another and pressed against one another and connected to one another by a peripherally extending welding seam. After being heated to approximately 1300° C., they are to be rolled out with a roll separating force of approximately $8 \times 10^4$ kN.

Based on the data of this patent, it is not easily possible to produce composite sheet steels which fulfill the requirements.

SUMMARY OF THE INVENTION

It is an object of the present invention to provide a method for manufacturing a sheet steel providing a high safety against shots and the effect of explosives.

In accordance with the present invention, this is achieved in connection with a method of the aforementioned kind in that the steel of the inner layer is produced with a chemical composition in percent by weight of C≦0.01, Si≦0.1, Mn≦0.1, P≦0.005, S≦0.005, Cu≦0.1, Mo 4.80 to 5.20, Ni 17.5 to 18.5 , Cr≦0.1, Ti 0.55 to 0.70, Co 8.0 to 9.0 as well as optionally Al 0.05 to 0.15, and in that the steel of the outer layer is produced with a chemical composition, obtained by purification by means of zone melting, in percent by weight of C≦0.01, Si<0.1, Mn 0.02 to 0.20, P≦0.005, S≦0.005, Cu 0.01 to 0.20, Mo 4.80 to 5.20, Ni 17.5 to 18.5, Cr 0.01 to 0.20, Ti 1.80 to 1.95, Co 14.0 to 15.5, Al 0.05 to 0.15, with the remainder being Fe and contaminants resulting from the manufacturing process, respectively.

A composite sheet steel produced accordingly fulfills high requirements which will be explained in more detail in the following.

In comparison, to the manufacture of the above-mentioned known composite sheet steel, according to the invention at least the outer layer has a different construction.

In regard to the chemical composition the outer layer differs, in particular, by the added component aluminum, by a different and higher contents of Ti and Mn, and by a substantially different and higher contents of Cu. Moreover, the maximum contents of C, P, and S is reduced, respectively, and the Mo range is greatly limited. Of great importance in this connection is the added method step of zone melting.

The aluminum contents of 0.05 to 0.15% still present after the zone melting step ensures a high oxide purity degree. The aluminum contents, surpassing the above mentioned contents prior to the zone melting process, prevents the formation of other oxides, especially of TiO and $Ti_2O_3$, and separates together with the oxygen bonded thereto from the slab during the zone melting process. The steel is thus substantially free of oxide inclusions which, according to the assumption of the invention, should be avoided as much as possible because of their notch effect causing cracks, in particular, during loading of the steel when subjected to shots, and this cannot be neglected in this context.

The reduction of the segregation tendency as a result of the decisive reduction of the contents of phosphorus and sulfur is to be considered approximately along the same lines.

The suggested increased contents of Mn effects an increased solid solution formation in the nickel martensite which increases the strength and hardness.

In the same way, the strength and hardness are further improved by the increase of the copper contents.

In the steel of the inner layer, however, Mn is limited to a maximum of 0.1%, and Cu is reduced to at most half the value in order not to impair the desired tenacity in the inner layer.

In the same sense, but with greater overlap with respect to the analysis of the known composite steel, a minimum contents of Cr is provided for the outer layer as well as a substantially increased maximum contents. In contrast thereto, the Cr contents remains limited for the inner layer.

The stringent limitation of the Mo contents is desirable in order to achieve a reproducible optimum for the overall effect of the provided alloy elements and alloy contents.

Since according to the invention not only the Ti contents is increased but moreover the C contents is limited to half the value, less Ti is bound by C and, accordingly, the strength-increasing and hardness-increasing effect of titanium in the steel of the outer layer is taken advantage of to an even greater extent, especially by inclusion in the intermetallic phases. At the same time, an improved tenacity behavior is achieved during the greatly dynamic loading when subjected to shots.

On the other hand, the Ti contents is reduced in the steel of the inner layer in order to adjust a favorable tenacity.

For the steel of the inner layer a zone melting is not an absolute requirement, but is nonetheless advantageous. The same holds true for the component aluminum which is optional in the inner layer.

Because of the desired purity, both steels should be melted under vacuum, preferably by vacuum induction melting.

The mechanical manufacture of the composite sheet steel is carried out preferably such that the outer layer and the inner layer, after cleaning, for example, by grinding, of the contact surfaces, are connected by explosive cladding and subsequent rolling of two plates comprised of the two steels.

However, possible is also a pure roll-bonding process. However, in this connection, metallic contact surfaces on the two plates to be connected should be provided by a metal removing machining process such as planing or milling.

Moreover, before the roll-bonding process is carried out, the plates should be welded together tightly peripherally and a high vacuum should be generated between the two plates.

The best resistance of the composite sheet steel against shots can be achieved when for the safety requirements according to EN (Euronorm) 1522, shot class ("Beschußklasse") B7 (hardcore ammunition), the thickness ratio between the outer layer and the inner layer is selected to be between 1.5:1 and 4:1 and for the safety requirements according to EN 1522, shot classes ("Beschußklasse") B6/B5, is selected to be between 0.3:1 and 1:1.

DESCRIPTION OF THE PREFERRED EMBODIMENTS

The invention will now be explained in more detail with the aid of several embodiments.

EXAMPLE 1

A composite sheet steel was produced as follows:

For the inner layer, a steel was melted in a vacuum induction furnace which, after a zone melting process in a vacuum arc furnace, contained in percent by weight: 4.91 Mo, 17.75 Ni, 0.034 Cr, 0.60 Ti, 8.40 Co, 0.007 C, 0.038 Si, 0.032 Mn, 0.002 P, 0.005 S, 0.013 Cu, and 0.105 Al.

For the outer layer, a steel was melted also in a vacuum induction furnace which, after a zone melting process in a vacuum arc furnace, contained in percent by weight: 4.93 Mo, 17.95 Ni, 0.037 Cr, 1.85 Ti, 14.19 Co, 0.006 C, 0.035 Si, 0.032 Mn, 0.003 P, 0.003 S, 0.018 Cu, and 0.095 Al.

The obtained blocks were first rolled out to slabs whose thickness corresponds to the thickness ratio of the layers in the sheet steel.

The slabs were then milled and cleaned on one side for formation of metallic contact surfaces, placed with the contact surfaces against one another, and bonded to one another by explosive cladding.

After heating in a rolling mill furnace to 1250° C. the slab produced by explosive cladding was rolled out in multiple passes.

In the finished sheet steel the layer provided as the inner layer had a thickness of 3.1 mm, the layer provided as the outer layer had a thickness of 5.7 mm.

Under these circumstances, metal bonding occurs to a high degree between the freshly exposed metallic surfaces of the two steels of substantially identical microstructure determined by the nickel martensite.

A strong composite steel with the following hardness resulted.

| | hardness [HRC] | | |
|---|---|---|---|
| outer layer | 59.9 | 60.9 | 60.5 |
| inner layer | 51.5 | 49.8 | 49.9 |

Two samples of 300×300 mm$^2$ were subjected to shots at a shot testing facility according to EN 1522, shot class FB7, with full-jacketed hard-core ammunition of the caliber 7.62× 51.

All 12 shots (projectiles), six for each sample, were stopped by the sample.

EXAMPLE 2

A sheet steel as in Example 1 was machined to a thickness of 3.0 mm of the inner layer and 5.5 mm thickness of the outer layer. The hardness of the two layers can be taken from the following table.

| | hardness [HRC] | | |
|---|---|---|---|
| outer layer | 60.7 | 60.0 | 60.5 |
| inner layer | 51.1 | 51.3 | 51.2 |

A single sample of 300×300 mm$^2$ was subjected to 12 shots as explained above. All projectiles were stopped by the sample.

EXAMPLE 3

For producing the two steels, the same method was used as in Example 1, but the steel of the outer layer contained in percent by weight: 5.07 Mo, 18.00 Ni, 0.015 Cr, 1.83 Ti, 14.5 Co, 0.004 C, 0.029 Si, 0.051 Mn, 0.003 P, 0.003 S, 0.012 Cu, 0.107 Al.

The obtained blocks were first again rolled out to slabs whose thicknesses correspond to the thickness ratio of the layers in the sheet steel.

The slabs were milled and cleaned on one side, respectively, for formation of metallic contact surfaces, placed against one another with the contact surfaces, and peripherally welded so as to be sealed. The unavoidable remaining space between the contact surfaces enclosed by the welding seam was evacuated to less than 10$^{-11}$ Pa.

After heating in a rolling mill furnace to 1250° C. the slab packet was rolled out in several passes.

In the finished sheet steel the layer provided as the inner layer had a thickness of 2.95 mm, the layer provided as the outer layer had a thickness of 5.40 mm.

In this case, metal bonding was also obtained to a high degree, and a strong composite steel was obtained. The following hardness values were measured.

| | hardness [HRC] | | |
|---|---|---|---|
| outer layer | 60.7 | 60.7 | 60.8 |
| inner layer | 49.7 | 49.3 | 48.5 |

Ten samples of 300×300 mm$^2$ were fired at three times as described above. All 30 shots (projectiles) were stopped.

EXAMPLE 4

Another sheet steel was produced as in Example 3, having an inner layer with 1.5 mm thickness and an outer layer with 5.0 mm thickness. The measured hardness values are as follows.

| | hardness [HRC] | | |
|---|---|---|---|
| outer layer | 59.6 | 61.1 | 61.2 |
| innerlayer | 49.7 | 49.7 | 49.5 |

The sheet steel is provided for use in combination with other projectile-inhibiting materials.

While specific embodiments of the invention have been shown and described in detail to illustrate the inventive principles, it will be understood that the invention may be embodied otherwise without departing from such principles.

What is claimed is:

1. A method of manufacturing composite sheet steel of maraging steel, wherein the composite sheet steel comprises an outer layer and an inner layer, wherein the outer layer is harder than the inner layer and the inner layer is more tenacious than the outer layer, the method comprising the steps of:

producing steel of the inner layer with a chemical composition containing in percent by weight: $C \leq 0.01$, $Si \leq 0.1$, $Mn \leq 0.1$, $P \leq 0.005$, $S \leq 0.005$, $Cu \leq 0.1$, Mo 4.80 to 5.20, Ni 17.5 to 18.5, $Cr \leq 0.1$, Ti 0.55 to 0.70, Co 8.0 to 9.0, with the remainder being Fe and contaminants resulting from the manufacturing process; and producing steel of the outer layer, with purification in a zone melting process by removing aluminum, added to suppress formation of oxides other than aluminum oxide, and oxygen bonded thereto, with a chemical composition containing in percent by weight: $C \leq 0.01$, $Si < 0.1$, Mn 0.02 to 0.20, $P \leq 0.005$, $S \leq 0.005$, Cu 0.01 to 0.20, Mo 4.80 to 5.20, Ni 17.5 to 18.5, Cr 0.01 to 0.20, Ti 1.80 to 1.95, Co 14.0 to 15.5, Al 0.05 to 0.15, with the remainder being Fe and contaminants resulting from the manufacturing process.

2. The method according to claim 1, wherein the steel of the inner layer contains additionally in percent by weight: Al 0.05 to 0.15.

3. The method according to claim 1, further comprising the step of purifying the steel of the inner layer by zone melting.

4. The method according to claim 1, further comprising the step of melting the steel of the outer layer under vacuum.

5. The method according to claim 4, further comprising the step of melting the steel of the outer layer in a vacuum induction furnace.

6. The method according to claim 1, further comprising the step of melting the steel of the inner layer under vacuum.

7. The method according to claim 6, further comprising the step of melting the steel of the inner layer in a vacuum induction furnace.

8. The method according to claim 1, further comprising the steps of forming a first plate of the steel of the inner layer and a second plate of the steel of the outer layer, cleaning the first and second plates on one side thereof, respectively, to form contact surfaces, and bonding the first and second plates to one another via the contact surfaces by explosive cladding and by subsequent rolling to form the composite sheet steel with the inner and outer layers.

9. The method according to claim 1, further comprising the steps of forming a first plate of the steel of the inner layer and a second plate of the steel of the outer layer, machining with metal removal the first and second plates on one side thereof, respectively, to form metal contact surfaces, and bonding the first and second plates to one another via the contact surfaces by roll-bonding to form the composite sheet steel with the inner and outer layers.

10. The method according to claim 9, further comprising the steps of welding peripherally the first and second plates together to be sealed and producing a vacuum between the first and second plates before roll-bonding is performed.

11. The method according to claim 1, further comprising the step of adjusting a thickness ratio of the outer layer to the inner layer to be between 1.5:1 and 4:1 in order to comply with the safety requirements of EN 1522, shot class B7.

12. The method according to claim 1, further comprising the step of adjusting a thickness ratio of the outer layer to the inner layer to be between 0.3:1 and 1:1 in order to comply with the safety requirements of EN 1522, shot class B6/B5.

* * * * *